United States Patent [19]
Harrison

[11] Patent Number: 6,105,318
[45] Date of Patent: Aug. 22, 2000

[54] SEASONALLY SELECTIVE PASSIVE SOLAR SHADING SYSTEM

[76] Inventor: Janet Harrison, 1867 Lindamoor Dr., Annapolis, Md. 21401

[21] Appl. No.: 09/151,397

[22] Filed: Sep. 11, 1998

[51] Int. Cl.⁷ .................................................. A47H 33/00
[52] U.S. Cl. ........................... 52/200; 52/473; 52/171.3; 160/104
[58] Field of Search .................... 52/200, 473, 171.3; 160/104, 107, 176.1

[56] References Cited

U.S. PATENT DOCUMENTS

| | | |
|---|---|---|
| 2,166,441 | 7/1939 | Jones ................................. 160/176.1 R |
| 2,167,840 | 8/1939 | Hepworth ......................... 160/176.1 X |
| 2,210,516 | 8/1940 | Wheeler ................................. 52/473 X |
| 2,382,566 | 8/1945 | Heckman . |
| 3,014,252 | 12/1961 | Osborne . |
| 3,113,357 | 12/1963 | Reukauf et al. ....................... 52/473 X |
| 3,197,820 | 8/1965 | Claire, Sr. et al. . |
| 3,260,026 | 7/1966 | Bacon . |
| 3,273,298 | 9/1966 | Jordal . |
| 3,287,870 | 11/1966 | Johnson ..................................... 52/473 |
| 3,423,148 | 1/1969 | Reboul . |
| 3,438,167 | 4/1969 | Royston, Jr. ............................... 52/473 |
| 4,365,620 | 12/1982 | Bliamptis ........................... 52/171.3 X |
| 4,398,587 | 8/1983 | Boyd . |
| 4,409,960 | 10/1983 | Balzer ..................................... 52/473 X |
| 4,427,048 | 1/1984 | Osaka et al. ............................. 160/107 |
| 4,486,073 | 12/1984 | Boyd . |
| 4,505,069 | 3/1985 | Freeman ................................. 52/200 X |
| 4,509,825 | 4/1985 | Otto et al. . |
| 4,841,672 | 6/1989 | Nebhuth et al. . |
| 4,951,728 | 8/1990 | Takano . |
| 5,072,561 | 12/1991 | Pitt ............................................ 52/473 |
| 5,285,315 | 2/1994 | Stiles . |
| 5,301,736 | 4/1994 | Wu . |
| 5,701,939 | 12/1997 | Pinto et al. . |

OTHER PUBLICATIONS

"Window Treatment for Energy Conservation," McCluney et al.; Florida Solar Energy Center.

"Recommended Practice for the Calculation of Daylight Availability," Journal of IES/ Jul. 1984.

*Primary Examiner*—Carl D. Friedman
*Assistant Examiner*—Phi Die Tran A
*Attorney, Agent, or Firm*—Nixon & Vanderhye

[57] ABSTRACT

The shading system includes a plurality of shading elements forming groups of elements for each window of a building. The elements generally have non-horizontal and non-vertical slope and tilt angles. The slope and tilt angles are determined by the latitude of the building and compass bearing of a plane through the window. All of the elements for each window lie parallel to one another and are non-movable. By calculating slope and tilt angles for each compass bearing and building latitude, the solar heat gain in the summer can be minimized and solar heat gain in the winter can be maintained.

16 Claims, 7 Drawing Sheets

SEASONALLY SELECTIVE PASSIVE SOLAR SHADING SYSTEM

BACKGROUND

The present invention relates to a shading system, particularly for regulating the solar heat gain from the sun and particularly relates to a passive, seasonally selective shading system for limiting solar heat gain in the summer and enabling solar heat gain in the winter, while affording adequate visibility.

As well known, the orientation of windows vis-a-vis the sun has substantial impact on the heat gain within a building. For example, windows having substantial east and west exposures cause significant heat gains within the building during summertime. On southern exposures, the heat gain is usually less because the sun is higher. Such heat gain substantially increases energy costs for air conditioning at lower latitudes. Many different systems have been proposed and constructed to alleviate this problem, including both active and passive systems.

Active systems typically include movable shading systems for shading the interior of the building from the sunlight in order to minimize the heat gain, particularly during the summer and early morning and late afternoon hours. Such conventional active systems comprise movable shades, shutters, blinds and the like. These systems, however, disadvantageously require a high degree of user interaction. While certain of these systems can be and are automated with improved effectiveness, automated systems are costly. All such systems also share the drawback of closing off the view, reducing visibility along with the heat gain.

Certain shading systems may be active or passive. For example, vertical or horizontal louvers may be employed, either as a fixed part of the building or movable to vary the shading effect in accordance with the time of day. On south orientations, where the sun reaches its highest point in the sky, horizontally positioned shade devices on such southern exposed windows provide a reasonable shading effect from the sun's most intense heat. Thus, active or passive horizontally oriented louvers, slats or blinds are reasonably effective. Overhangs on buildings are also effective but oftentimes impractical and costly, e.g., in large office-type buildings. On east and west orientations, passive horizontal shading elements, such as louvers, lose their effectiveness because the sun is lower in the sky in these directions. Vertically placed shading elements preserve some natural light, while blocking out late morning or early afternoon sun in the summer. However, the sun's position relative to the horizon shifts with the seasons, i.e., it rises and sets at a more southerly position during the winter and a more northerly position in the summer. In-between sunrise and sunset, the path of the summer sun passes more directly overhead. Consequently, vertical louvers on west orientations won't block the summer's mid-afternoon sun but will block almost all of the winter sun on east orientations when solar heating is most desirable.

Passive methods of limiting the solar heat gain, particularly in the summertime, also include use of tints, screens or films on or between insulating glass. Spectrally selective films block out the sun's heat-producing infrared rays, while admitting the light. However, these systems only block a portion of the direct rays of the sun in the summertime and cannot discriminate between seasons, depriving the building of beneficial solar heating during the winter.

A further method of minimizing heat gain in the summertime is to minimize or avoid placing windows on the east and west sides of the building altogether. Conventional thinking is to minimize the number of windows on the east or west sides of the building because it is very difficult to shade those sides. However, this solution inhibits the desired solar heat gain in the wintertime and also contributes to a lack of view and oftentimes ventilation.

Further, conventional shading systems typically employ opaque elements having either a horizontal or vertical orientation to block out the sun. By a horizontal orientation is meant that the opaque members lie in a plane parallel to a horizontal plane passing through the building site, i.e., tangent to the spherical earth at the building site. Vertical orientation, of course, is a line or plane perpendicular to the horizontal plane. It will be appreciated that where shading elements have a horizontal orientation in a south-facing wall of a building, that orientation prevents substantial heat gain and effects shading in the summertime without substantially limiting visibility. However, the walls of the building having east and west exposures and provided, for example, with similar horizontally oriented shading elements is not taken into account. Consequently, there is a substantial need for a passive seasonally selective system for limiting solar heat gain in the summer and enabling solar heat gain in the winter.

DISCLOSURE OF THE INVENTION

According to the present invention, there is provided a shading system, preferably passive, which is seasonally selective to minimize solar heat gain in the summer and enable solar heat gain in the winter and which features asymmetry of the shading elements affording shade in orientations determined principally by the latitude and compass bearing of the window of the building. This results in a shading system having shading elements oriented between horizontal and vertical orientations contrary to conventional systems. To accomplish the foregoing, shading elements are provided which have a slope and tilt relative to a horizontal plane tangent to the spherical earth at the building site dependent upon the latitude of the building site and compass bearing of the space occupied by the shading elements, typically a wall containing one or more windows. In short, the elements of the present shading system take advantage of the known apparent path of the sun throughout the seasons of the year to limit the solar gain in the summer and enable solar heat gain in the winter.

Characteristic of an aspect of the present invention is a series of shading elements which may be in the form of louvers, slats, blinds, fabric elements and the like which have length, width and depth dimensions and which lie generally parallel to one another in the space occupied thereby, e.g., within the building window, or between the area to be shaded and the sun. The elements are preferably opaque, having non-opaque areas between the elements for transmission of light. The louvers, however, can be formed of a spectrally selective material to minimize or eliminate heat transmission. Particularly, the shade elements are parallel to one another in each window (or spaced occupied thereby) and have identical slope and tilt angles in each window, the slope of the elements lying in non-horizontal or non-vertical sloped orientations. Generally speaking, the shading elements of the present invention are not always symmetrical about a vertical axis for each of the building walls in which the elements are disposed. Thus, the shading elements for each window having a different compass bearing at a particular building site will generally have different slope and tilt angles. Thus, the slope and tilt angles of the shading elements for an east-facing wall will be different than the slope and tilt angles of the shading elements for a south-facing wall for a given building location. Also, the slope and tilt angles of the shading elements will be typically different for building sites at different latitudes. Consequently, the orientation of the shading elements hereof are site-specific, dependent upon the latitude of the site and compass bearing of a plane containing the shading elements, e.g., a compass bearing normal to a building wall containing the window and the shading elements therein.

In order to determine the slope and tilt angles of shade elements for a building at a particular latitude with a wall having a window facing a specified compass direction, it will be appreciated that a sight line between the window and the sun movable along the sun's apparent path transcribes a compound curve at the building site. As set forth herein, different methods may be employed to determine the particular slope and tilt angles of the shade elements based on those paths. The louvers should be parallel to the compound curve formed by the path of the sun and to each other at a target date, e.g., the winter solstice. The tilt of the louvers at each compass bearing is equal to the altitude of the sun at that bearing at a given target day. Recognizing the compound nature of the curve of the apparent path of the sun during the seasons, particularly winter and summer, a close approximation can be made of the desired slope and tilt angles of the shade elements which will provide near optimum performance. It also facilitates manufacture of the elements. Thus, the slope and tilt of shading elements in a space occupied thereby, e.g., each window of a building wall, can be found by employing the following two equations:

tan s=tan (90-23.5-lat)×sin b tan t=tan(90-23.5-lat)×sin(90-b)

wherein:
s=slope angle of the elements
b=bearing in compass degrees of a line normal to a plane containing the elements, e.g., a window
t=tilt angle of the elements
lat=latitude of the site in question.

Thus, by solving for s and t at the particular compass bearing of the window and latitude of the building site, the slope and tilt angles for each shading element, e.g., a louver, in that window can be determined. By using this method, it has been found that the slope and tilt angles of the elements are such that the elements in each window lie generally parallel to a common plane with the slope of the elements in one of the windows defining an acute angle with a horizontal plane extending through the one window. That is, the slope and tilt angles of the shading elements are typically neither horizontal nor vertical but rather are inclined to both. More specifically, using this method, all of the shading elements for all of the windows of different compass bearings at the same latitude will lie parallel to the common plane.

A second formula can be used to more closely approximate the apparent path of the sun along the compound curve. Each wall of the building shares a plane and all louvers parallel to the plane are at a common slope and tilt. Each wall will, however, have louvers having different slope and tilt angles as compared with other building walls at other compass bearings.

Thus, the slope and tilt angles of the shading elements, dependent upon the compass bearing of a line normal to the window and the latitude of the building site, can be determined by solving the following equations:

s=arc tan [tan(90-lat)×sin b]+23.5×sin (b-180)

t=arc tan [tan(90-lat)×sin(90-b)]+23.5 (cos s)

wherein:
s=slope angle of the elements
b=bearing in compass degrees of a line normal to a plane containing the elements, e.g., a window
t=tilt angle of the elements
lat=latitude of the site in question.

This latter equation takes into account the compound curved nature of the apparent movement of the sun for each day.

Once the slope and tilt angles are determined using one of the two equations identified above, those angles can be manipulated along with other variables, e.g., louver spacing, width and thickness to control the magnitude of the shading afforded by the shading elements at different times of day and seasons. This becomes an iterative operation which can be applied with different variables until design criteria are met as set forth below.

In another aspect of the present invention, the shading elements may comprise elongated louvers twisted about their long axes. For example, louvers provided in windows on the west side of a building may have a twist from one end of the louver to its opposite end of the louver about the long axis. The twist in the louvers accommodates the apparent movement of the sun from the southwest to the northwest, optimizing the shading effect. Therefore, louvers in the window on the west side of a building would have a positive or downward tilt on the north end of the louvers and a negative or upward tilt on the south end of the louvers, with the twist extending gradually along the long axis of the louver.

In a preferred embodiment according to the present invention, there is provided in a building having a plurality of walls angularly related to one another and windows in the walls having at least in part a solar exposure, a shading system, comprising a plurality of elongated, generally linearly extending elements spaced from one another forming a group of shading elements for each of the windows and having non-opaque areas between the elements for transmitting light, the elements for each window having length, width and thickness dimensions and extending generally parallel to one another at predetermined slope and tilt angles, the slope and tilt angles of the elements being such that the elements for each window lie generally parallel to a common plane with the slope of the elements in one of the windows defining an acute angle with a horizontal plane extending through the one window, the common and horizontal planes being angularly related to one another.

In a further preferred embodiment according to the present invention, there is provided in a building having a plurality of walls angularly related to one another and windows in the walls having at least in part a solar exposure, a shading system, comprising a plurality of elongated, generally linearly extending elements spaced from one another forming a group of shading elements for each of the windows and having non-opaque areas between the elements for transmitting light, the elements for each window having length, width and thickness dimensions and extending generally parallel to one another at predetermined slope and tilt angles, the slope and tilt angles of the elements for each window corresponding to the slope and tilt angles of a plane passing tangent to a surface of revolution defined by the apparent path of the sun at a given time along a sight line from the building to the sun in a plane perpendicular to a plane of the window.

In a still further preferred embodiment according to the present invention, there is provided in a building having at least one wall and a window in the wall having at least in part a solar exposure, a shading system, comprising a plurality of elongated, generally linearly extending, elements spaced from one another forming a group of shading elements for the window and having non-opaque areas between the elements for transmitting light, the elements in the window having length, width and thickness dimensions and extending generally parallel to one another at predetermined slope and tilt angles, not parallel to horizontal and vertical planes.

In a still further preferred embodiment according to the present invention, there is provided in a building having a wall and a window in the wall having at least in part a solar exposure, a shading system, comprising a plurality of elongated elements spaced from one another forming a group of shading elements for the window and having non-opaque areas between the elements for transmitting light, each of the elements having length, width and thickness dimensions and a long axis, the axes of the elements extending generally parallel to one another, each of the elements having a twist about the axis thereof.

In a still further preferred embodiment according to the present invention, there is provided a shading system comprising a plurality of elongated, generally linear elements spaced from one another forming a group of shading elements and having non-opaque areas between the elements for transmitting light, the elements having length, width and thickness dimensions and extending generally parallel to one another at predetermined slope and tilt angles, the slope and tilt angles of the elements being such that elements for each group lie generally parallel to a common plane which slopes upward to the south.

In a still further preferred embodiment according to the present invention, there is provided in an apparatus for shading a space, the apparatus having a plurality of generally elongated, linearly extending shading elements and non-opaque areas between the elements for transmitting light, the elements extending at slope and tilt angles relative to horizontal and vertical orientations at a site of the space, a method comprising the step of determining the slope and tilt angles of the elements in accordance with the latitude of the site and compass bearing of the space occupied by the elements.

In a still further preferred embodiment according to the present invention, there is provided in a shading system including a plurality of elongated, generally linearly extending louvers having length, width and dimensions forming a group of shading elements having non-opaque areas between the elements for transmitting light and extending generally parallel to one another into a common plane at predetermined slope and tilt angles, a method of manufacturing the louvers, comprising the steps of forming a plurality of segments having end faces formed at the slope and tilt angles of the common plane, disposing the segments between the louvers for the end faces parallel to the louvers, thereby orienting the louvers parallel to one another and to the common plane, with each louver at a predetermined angle.

Accordingly, it is a primary object of the present invention to provide a seasonal selective passive shading system for limiting solar heat gain in the summer and enabling solar heat gain in the winter.

BEST MODE FOR CARRYING OUT THE INVENTION

Figure 1A:
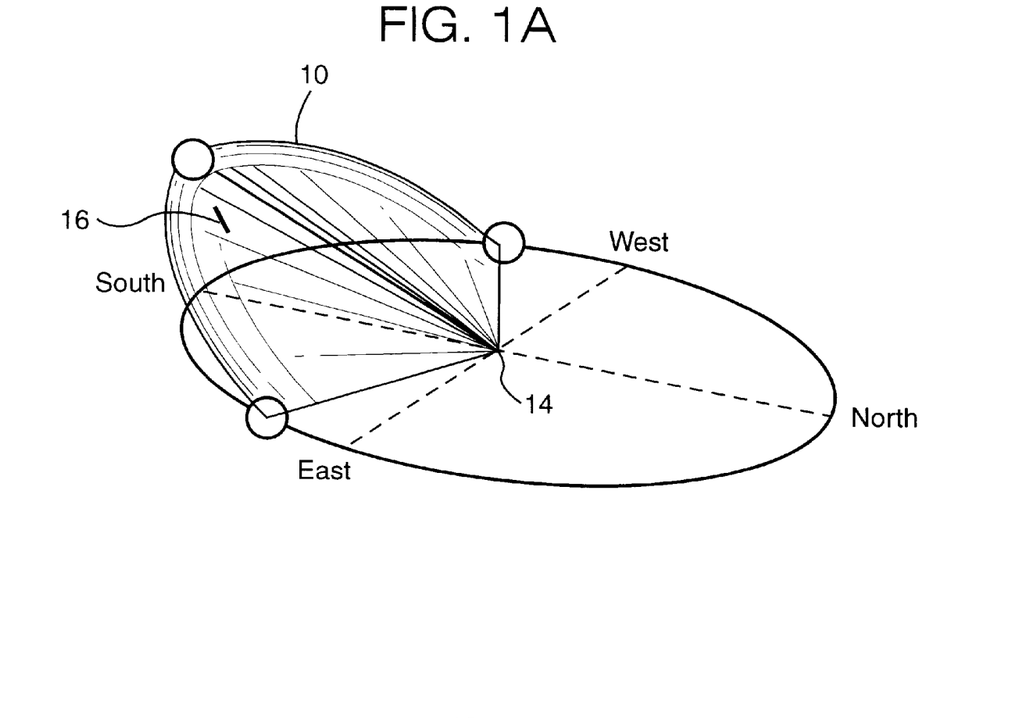
FIGS. 1A and 1B are schematic representations of the apparent path of the sun during winter and summer seasons, respectively.
Figure 1B:
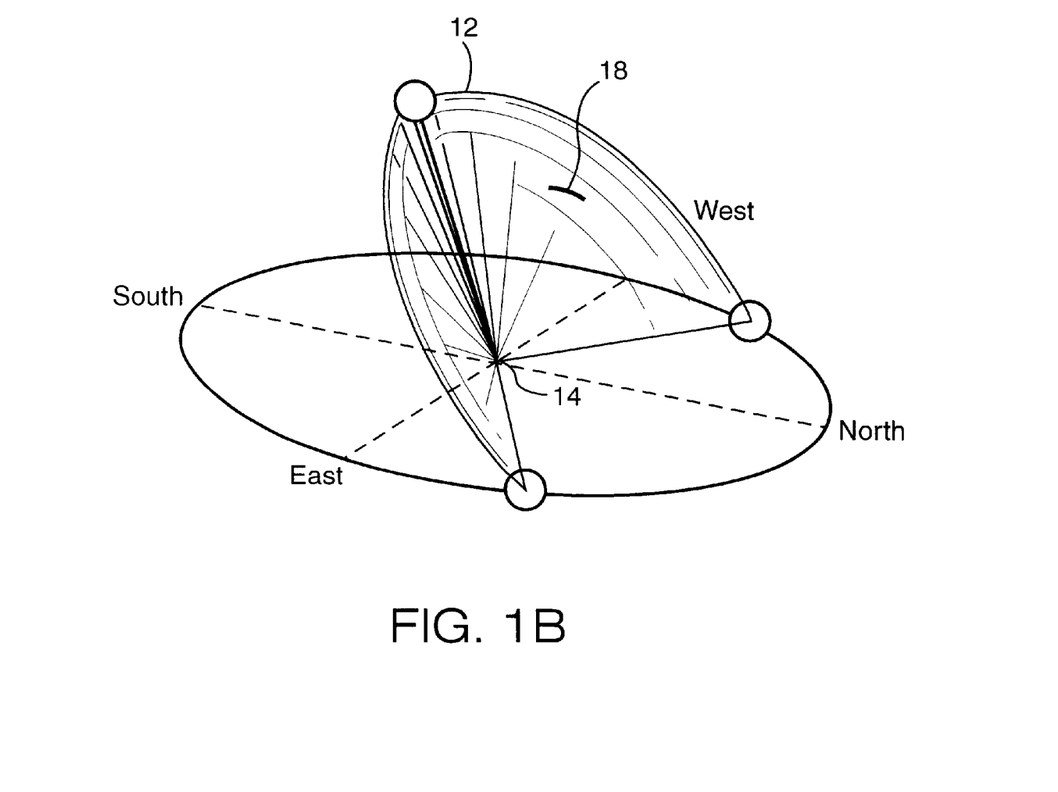

Referring now to the drawing figures, particularly to FIGS. 1A and 1B, there are illustrated apparent paths of the sun for a given location or building site on the earth's surface at the intersection of the north/south/east/west coordinates for the winter and summer seasons, respectively. For example, the apparent path of the sun during the winter season is illustrated at 10, while the apparent path of the sun during the summer season is illustrated at 12. It will be appreciated that as the earth rotates and moves about the sun, the line of sight between the building site 14 and the apparent path of the sun transcribes a surface of revolution, i.e., a portion of a compound curved surface 16 and 18. To accommodate for the seasonally different apparent paths of the sun about the building site location 14, the present shading system provides passive shading elements in various windows of the building, depending on the latitude of the site and the compass bearing normal to the windows, and having slope and tilt angles generally in non-horizontal and non-vertical orientations relative to a horizontal plane.

Figure 5:
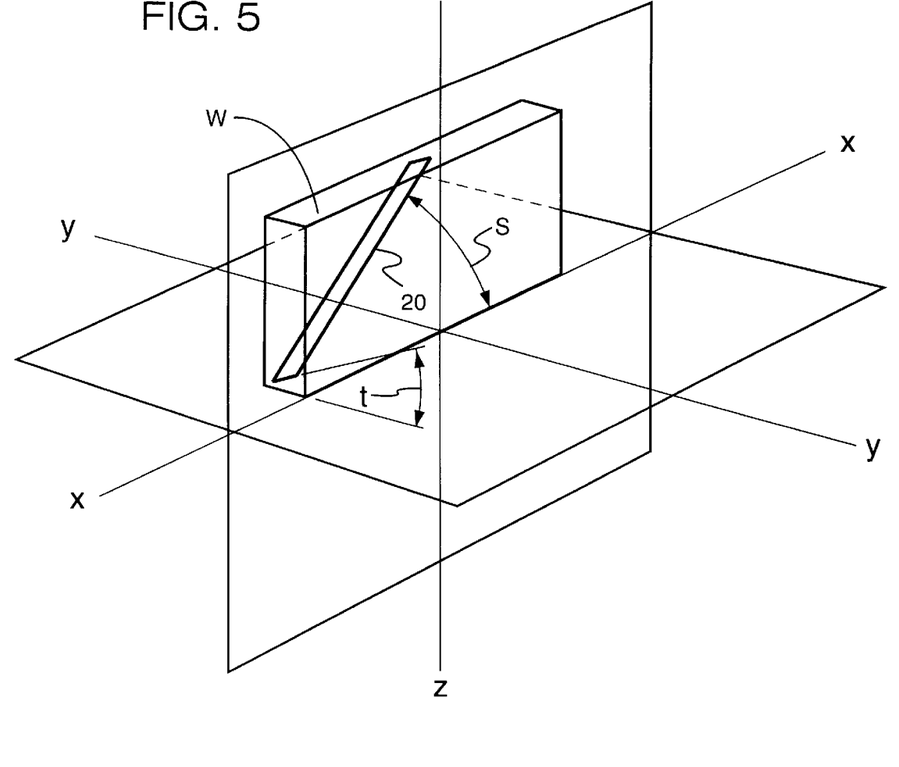
FIG. 5 is a Cartesian coordinate system identifying the slope and tilt angles of the shading elements of the present invention in such system.

For clarity and referring to FIG. 5, there is illustrated a Cartesian coordinate system having X, Y and Z axes wherein a shading element 20 and a window W in which the shading element resides lies in the X, Z plane and the X and Y axes define a horizontal plane tangent to the spherical earth at the building site at the origin of the coordinate system. Thus, the shading elements for each window of the building have a slope angle s between the horizontal X, Y plane and a line in the X, Z plane intersecting the element 20, i.e., a line parallel to the length dimension L or constituting a long axis of the element. The tilt angle t of each element is the angle between the X, Y plane and a line in the Y, Z plane intersecting the louver.

Figures 2, 2A:
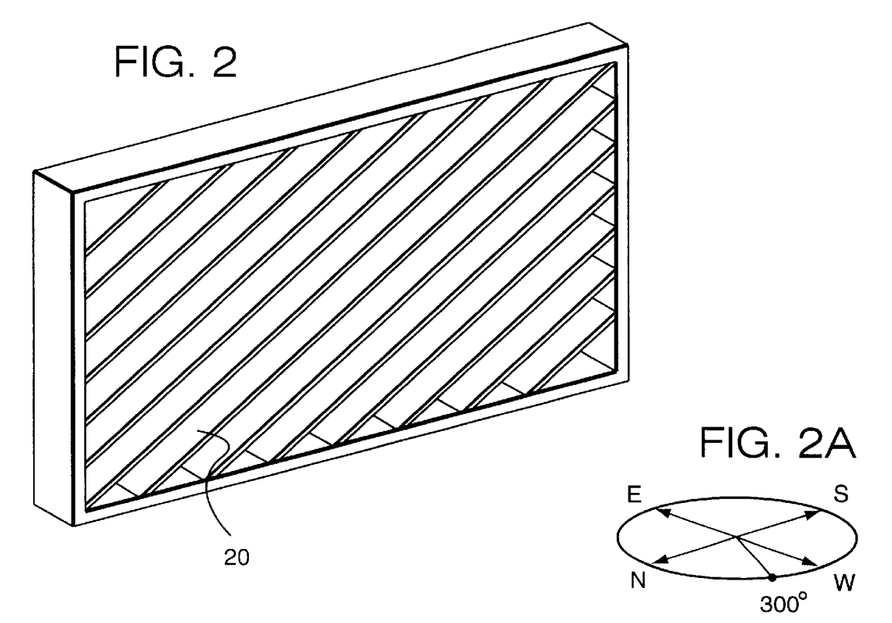
FIG. 2 is a perspective view of a window unit having shading elements at slope and tilt angles in accordance with the present invention.
FIG. 2A is the compass orientation for the window of FIG. 2.
Figure 3:
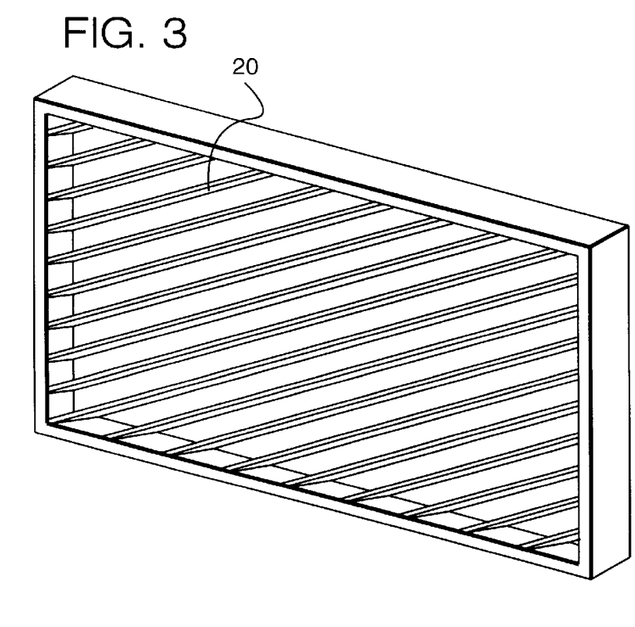
FIG. 3 is a view of the window unit with shading elements of FIG. 2 as viewed from a different compass orientation.
Figure 3A:
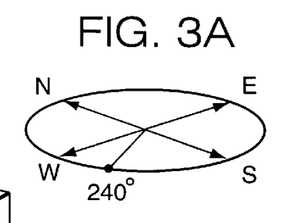
FIG. 3A is the compass orientation for the window of FIG. 3.

The shading elements 20 of the shading system hereof will typically, in this preferred embodiment, be comprised of opaque or spectrally selective louvers disposed in window units at fixed slope and tilt angles with non-opaque light transmitting areas between the louvers. The louvers are preferably fixed in position vis-a-vis the window and lie parallel to one another in each window. Shade elements 20 of this type are illustrated in FIGS. 2 and 3. It will be appreciated however that many different types of elements 20 may be provided e.g. louvers disposed between panes of insulating glass.

In order to adjust for the seasons of the year and the particular latitude of the building site to afford a near-optimum balance between percentages of light admission affording better visibility and limiting solar heat gain during summer months while enabling solar heat gain in the winter months, desired slope and tilt angles for each of the windows in each wall of the building are identified. To determine the slope and tilt angles for such shading elements for a given compass bearing of the window and latitude of the building, we start with the following equation may be used (identified herein as Eq. A):

tan s=tan(90-23.5-lat)×sin b tan t=tan(90-23.5-lat)×sin(90-b)

wherein:

s=slope angle of the elements b=bearing in compass degrees of a line normal to a plane containing the shading elements, e.g., a window, and directed outwardly of the building t=tilt angle of the elements lat=latitude of the site in question.

Figure 4:
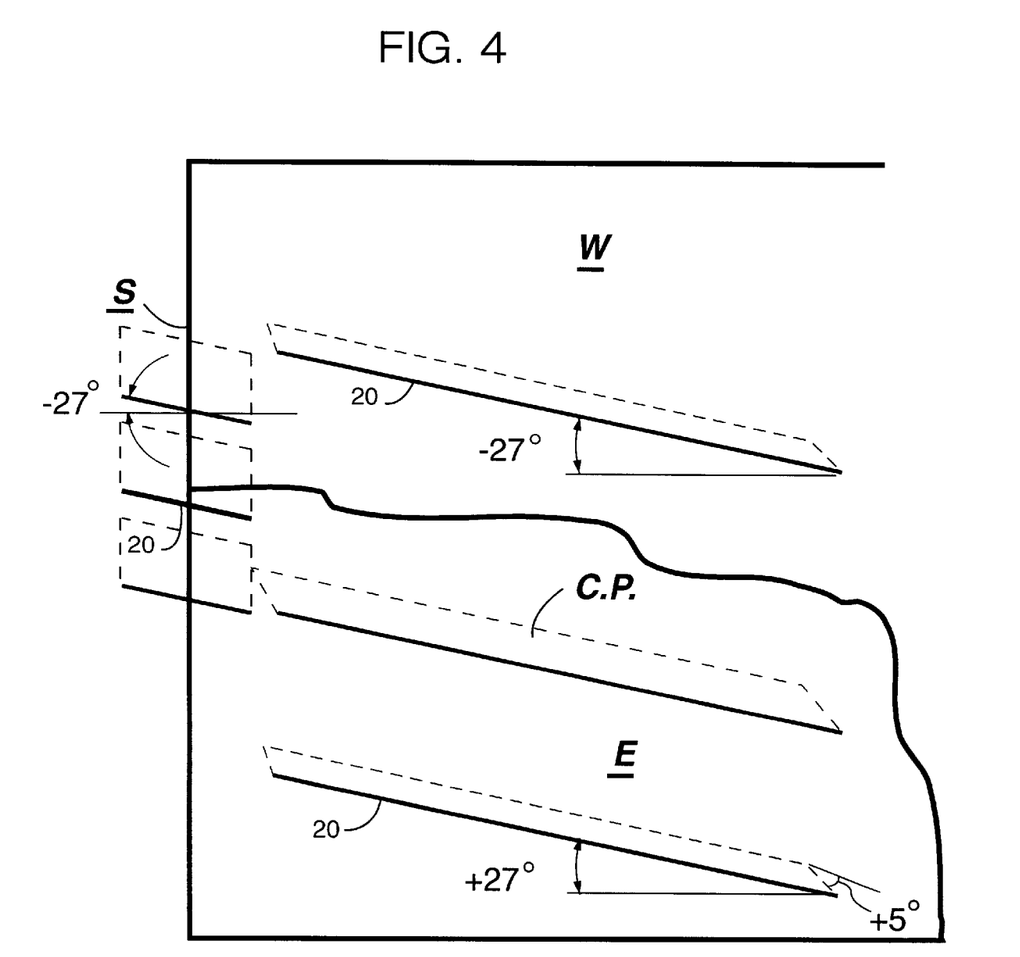
FIG. 4 is a elevational view of right angularly related building walls facing east, south and west and illustrating the slope and tilt angles of the shading elements in the walls.

For example, the slope and tilt angles of shading elements 20 in the windows of a building at latitude 39.5° and having right angularly related generally east, south and west oriented walls at compass bearings 80°, 170° and 260°, are as follows: for the east wall a slope of +27° and a tilt of +5°; for the south wall a slot of +5° and a tilt of −27°; and for the west wall a slot of −27° and a tilt of −5°. (While other conventions may be used, a positive slope angle as used herein is the upward slope of a shading element from right to left as viewed from outside (from the sun's vantage) looking inwardly toward the element relative to the horizontal and a positive tilt angle is the angle between a plane passing through the shading element parallel to its length and width dimensions and a horizontal plane with an outside edge or sun side of the element below an opposite inside edge of the element, i.e., a positive tilt angle slopes downwardly toward the outside of the window). The shading elements 20 for the windows of the east, south and west walls for a building at this latitude and the windows at the indicated compass bearings are schematically illustrated in FIG. 4. FIG. 4 is an elevational view looking directly at the east wall E, with the west wall W spaced behind the east wall and the south wall to the left. The full-line indications of the shading elements 20 are the near edges of the elements, e.g., louvers, while the dashed-lines represent the far edges of the same shading elements, near and far being from the viewer's perspective facing the east wall E. Only one such shading element is illustrated for each of the east and west walls, while several are illustrated for the south wall. Thus, as seen in FIG. 4, shading elements 20 for the east wall at a compass bearing 80° and latitude 39.5° have slope angles of +27° and tilt angles of +5°. The shading elements 20 for the south wall at a compass bearing of 170° and the same latitude have a slope angle of +5° and a tilt angle of −27°, three such shading elements 20 being illustrated. The shading elements for the west wall at a compass bearing of 260° have slope angles of −27° and tilt angles of −5°. It will become apparent that planes passing through each of the shading elements of these three walls, i.e., planes passing through length and width dimensions of the elements, lie parallel to a common plane C.P. It will be appreciated that by using the above-identified method, the slope and tilt angles for windows having shading elements in walls having different compass bearings and/or for buildings at different latitudes may be calculated. The result is a passive, site specific shading system having fixed shading elements which limit the solar heat gain in the summer and enable solar heat gain in the winter.

Figure 9:
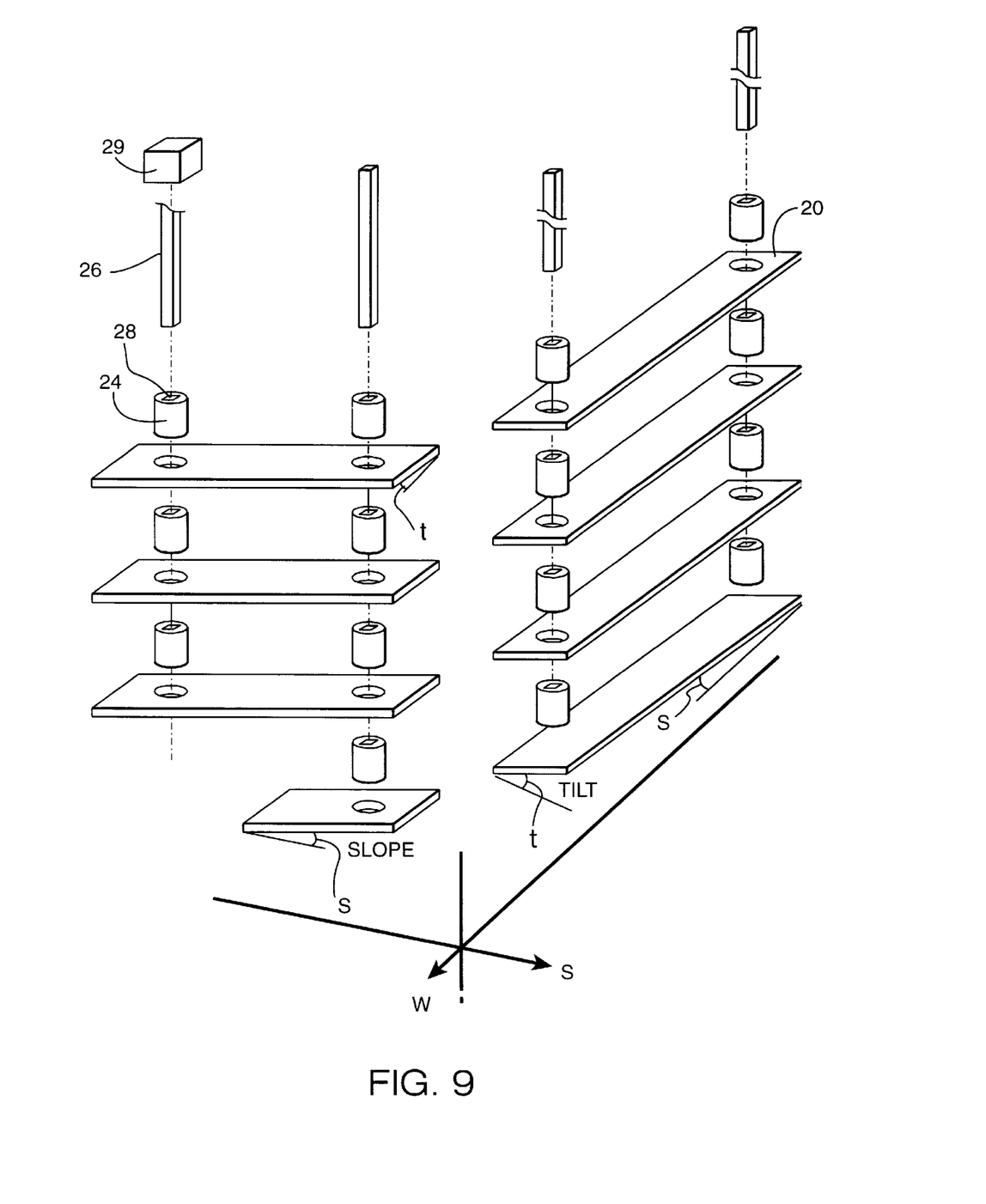
FIG. 9 is a perspective view of louvers having adjustable slope and tilt angles.

Also in accordance with the present invention, a method of manufacturing the shading system previously described, with the louvers parallel to a common plane is provided. With reference to FIG. 9, there is illustrated a plurality of louvers arranged at slope and tilt angles in south and west walls forming a window in a building structure, similarly as illustrated in FIG. 4. The louvers 20 are maintained at the predetermined slope and tilt angles parallel to the common plane C.P. by a plurality of segments 24 having upper and lower faces cut at angles to provide upper and lower faces in the common plane C.P. The illustrated system is similar to Venetian blinds wherein the louvers are supported by two or more elongated louver supports 26 fixed at their upper end, for example, to the window frame. The supports 26 have a shaped cross-section, e.g., square, for reception in correspondingly shaped openings 28 in the segments 24 whereby the angularity of the segments 24 about the vertical axes through the structures 26 may be maintained. It will be appreciated that with the upper and lower faces of the segments 24 cut at angles and arranged about the axes of the structures 26, the segments 24 will align the louvers 20 at the desired slope and tilt angles in each of the windows of the building.

It will also be appreciated that the slope and tilt angles of the louvers 20 can be adjusted when in place in a shading system. By rotating the support structures 26, for example, by a motorized unit 29 or manually by a crank, the segments 24 are rotated about their axes, altering the slope and/or tilt angles as desired. Consequently, seasonally optimal or even day-to-day optimal slope and tilt angles can be provided. This structure can also be tied into the crank of a casement window to move the louvers to compensate for the change in bearing when a window is opened.

Where it is desired to further limit the heat gain and more closely approximate the apparent path of the sun along the compound curve transcribed thereby, the following equation (hereafter Eq. B) is used to approximate the slope and tilt angles of the passive shading elements hereof:

s=arc tan [tan(90-lat)×sin b]+23.5×sin (b-180)

t=arc tan [tan(90-lat)×sin(90-b)]+23.5 (cos s)

wherein:

s=slope angle of the elements b=bearing in compass degrees of a line normal to a plane containing the shading elements, e.g., a window, and directly outwardly of the building t=tilt angle of the elements lat=latitude of the site in question.

Figure 7:
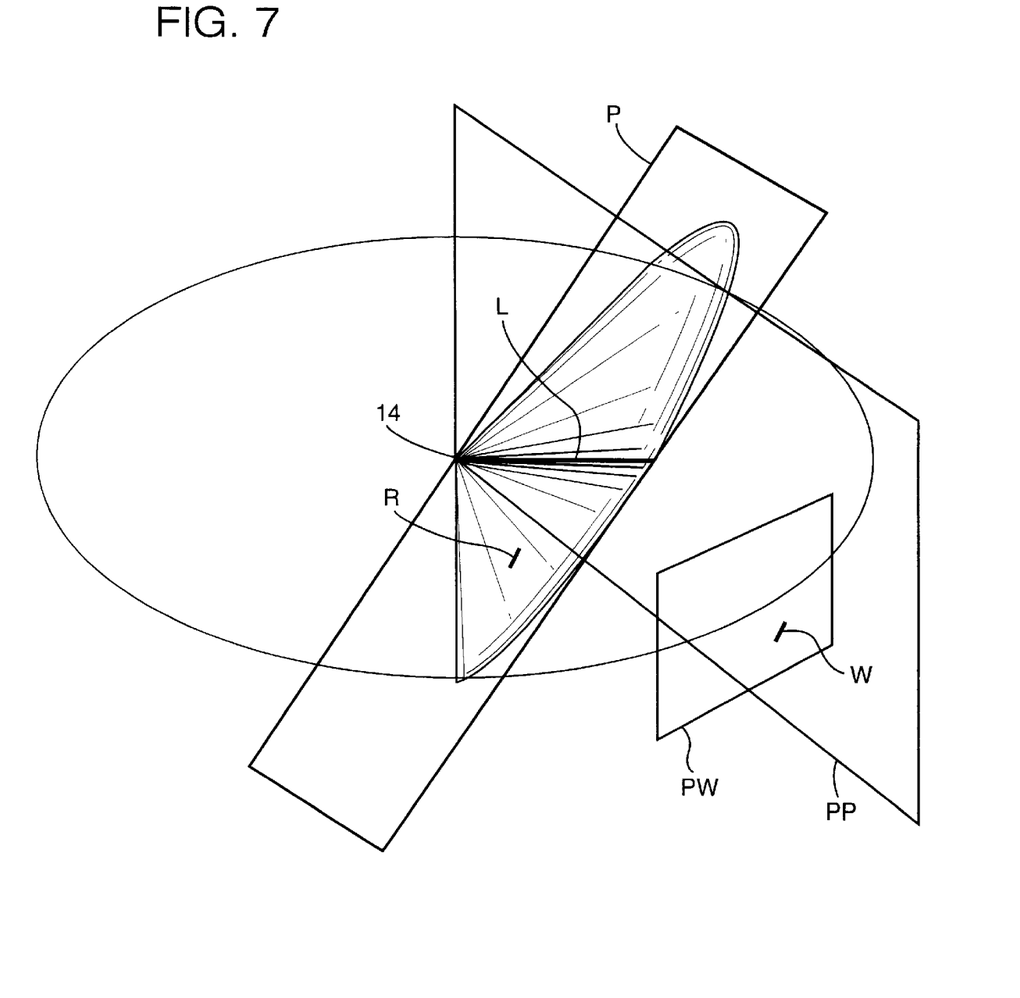
FIG. 7 is a schematic view of various planes identifying a particular slope and tilt of shading elements in the illustrated window.

By using Eq. B, for example, the various shading elements 20 of the various windows of the walls at the specified compass bearings will have slope and tilt angles corresponding, with reference to FIG. 7, to the slope and tilt of a plane P passing tangent to a surface of revolution R (representing the apparent path of the sun at a given time along a sight line from the building site 14 ) along a line L in a plane PP perpendicular to the plane PW of the window W.

Once a close approximation of the slope and tilt angles of the shading elements are approximated using Eq. A or B, then they can be optimized using a method which includes Eq. C. Eq. C calculates the amount of radiation allowed through the shading elements for a particular arrangement of the elements and at a particular time. Eq. C is as follows:

$$\% \text{ of radiation} = \frac{e - k \text{-abs value of}(\cos s \times \tan P \times \cos t \times d - \cos s \times \tan s \times \tan(or\text{-}az) \times \cos t \times d + \sin t \times d)}{e}$$

wherein:

e=the spacing of the shading elements, measured perpendicular to the elements k=the thickness of the elements d=the depth of the elements s=the slope of the elements calculated by either of Eq. A or B t=the tilt of the elements calculated by either of Eq. A or B p=the profile angle of the sun at the hour and orientation in question, as derived from conventional sun angle charts or formulas; profile angle is the angle between a normal to the window and the rays of the sun perpendicular to the window's plane or=compass orientation of a window; and az=azimuth or direction of sun at the hour in question In a preferred embodiment, to optimize the slope and tilt for a certain latitude and window orientation after first solving equations A and B to obtain an approximate optimum range about which to explore, fixed values for spacing, thickness and depth of the shading elements are selected, depending on the application (these values can also be varied, i.e., fine-tuned using Eq. C after the optimum slope and tilt angles have been found). Two matrices are then employed, one for winter, one for summer. Using slope and tilt angles derived from Eq. A, the % radiation using Eq. C for each hour that the orientation has solar exposure on the winter solstice is determined. These output values of radiation percentage for each hour are then averaged and recorded in the winter matrix for that slope and tilt.

This process is repeated for the slope and tilt angles derived from Eq. B, and the % radiation average is recorded in the winter matrix. The process is again repeated to find averages of % radiation for the angles surrounding these first two on the matrix. For example, increase, then decrease slope and tilt. Repeat process again for a few values in-between.

After repeating this process, a pattern emerges indicating which directions are producing higher heat gain averages. Other combinations of slope and tilt angles are then similarly processed in these directions. The process is thus run iteratively, following the increasing values and filling in the average values on the matrix until a cluster of high values forms a clear peak value in the center, giving the optimum combination of slope and tilt angles for highest overall % of radiation.

The foregoing process of determining % radiation is repeated using Eq. C for the summer matrix. In the summer matrix, low (or negative) values of radiation percentage are sought, i.e., reduced heat gain.

Winter versus summer needs are then balanced depending on the application. Also, if the tilt angle is too great for desired visibility in this optimized arrangement, the tilt angle can be decreased and additional iterations are processed until a best slope is found at the desired decreased tilt angle.

To summarize this method using Eq. C, the shading elements are fine-tuned for certain applications by adjusting the values of the slope angles s and tilt angles t slightly and running the calculations again to see the effect on the percentage of light at each season. By using this iterative operation with different variables, an optimum selection can be made. For example, by using the iterative operation, the best spread between summer and winter can be obtained. This is done by graphing, charting or otherwise comparing the output for several slightly different slope and tilt angles and projecting which direction the graph is headed.

A similar method of optimizing slope and tilt angles uses a daily total radiation value instead of the average percent of radiation. This latter method orients the shading elements toward the part of the sky where the most Btu's are available in the winter. The maximum available Btu's (on a clear day) change over the course of the day. These hourly values (clear sky values) are known and multiplied by each hour's percentage of admitted radiation from Eq. C to determine actual Btu's admitted. These total admitted Btu values are then entered on the winter or summer matrix for each combination of slope and tilt. The process is performed iteratively, as above, until a peak admitted Btu value is found for the winter. The process is repeated to find the summer.

This second method can also be done graphically. For example, maximum available Btu's are plotted on a Y-axis and the hour of the day on the X-axis for each slope and tilt combination.

Figure 6:
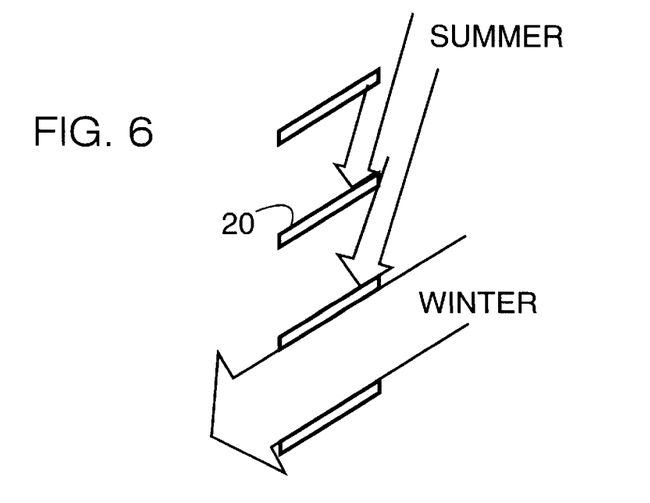
FIG. 6 is a schematic illustration of shading elements showing the different angles of the summer and winter sun on the elements.

After determining the appropriate slope and tilt angle, the spacing and the depth of the elements can be adjusted to the actual amount of sun desired, by using the principle shown in FIG. 6. If the application is between two panes of glass, then the depth of the elements is not variable and the adjustment is made by reducing the spacing between the elements. If the application is in a location with a view or where vision is important, then the angle of the tilt can be minimized. That can then be compensated for by adjusting either the slope, spacing or depth of the elements or combinations thereof.

Considerations governing the angles of the elements will vary from one site to another. These considerations include the latitude of the building, the orientation of the window, the type of window, the amount of sun desired, the amount of visibility, and the budget. Because of these variables, there is not necessarily only one correct arrangement of shading elements even for a window at a given latitude and orientation. It is therefore to be understood that the shading device is not limited to the example used in the following discussion.

The following is an example of a procedure which may be used to find optimum slope and tilt angles for shading elements in a west-facing wall at 40° latitude.

Eq. A may then be used to determine slope and tilt angles:

| | |
|---|---|
| tan s = tan (90 − 23.5 − lat) × sin 270 | tan t = tan (90 − 23.5 − lat × sin (90 − 270) |
| tan s = tan (90 − 23.5 − 40) × sin 270 | tan t = tan (90 − 23.4 − 40) × sin (90 − 270) |
| tan s = tan (26.5) × sin 270 | tan t = tan (26.5) × sin (−180) |
| tan s = .49858 × (−1) | tan t = .49848 × 0 |
| s = 26.49° | t = 0 |

These slope and tilt angles are then run through Eq. C for each hour of the day to find the percentage of light allowed through a window with these angles on certain target dates.

For simplicity, the solstice dates, December 21 and June 21, may be used. These time of day calculations can also be run for a span of time as opposed to a single date. For example, some areas may desire no sun between April 21 and August 21. Dates which are symmetrical about the solstices will have the same shading patterns. Using these new values for s and t, solve for the % of light using Eq. C. These calculations can be shown in spreadsheet form.

For example a spreadsheet for the winter solstice may appear as follows:

| | | | WINTER SOLSTICE - DECEMBER 21 | | | | | | |
|---|---|---|---|---|---|---|---|---|---|
| Time | Slope° | Tilt° | Profile Angle° | Azimuth° | Orientation° | Louver Spacing | Louver Width | Louver Thickness | Radiation % |
| | | | | 40° Lat. | | | | | |
| — | — | — | — | — | — | — | — | — | — |
| 1:00 | 26.5 | 0 | 61 | 195 | 270 | 1 | 1.5 | 0.05 | 0.873 |
| — | — | — | — | — | — | — | — | — | — |
| 4:00 | 26.5 | 0 | 7 | 233 | 270 | 1 | 1.65 | 0.05 | 0.610 |
| — | — | — | — | — | — | — | — | — | — |

The spread sheet for the summner solstice may appear as follows:

| | | | SUMMER SOLSTICE - JUNE 21 | | | | | | |
|---|---|---|---|---|---|---|---|---|---|
| Time | Slope° | Tilt° | Profile Angle° | Azimuth° | Orientation° | Louver Spacing | Louver Width | Louver Thickness | Radiation % |
| | | | | 40° Lat. | | | | | |
| — | — | — | — | — | — | — | — | — | — |
| 1:00 | 26.5 | 0 | 77 | 222 | 270 | 1 | 1.5 | 0.05 | −4.121 |
| — | — | — | — | — | — | — | — | — | — |
| 4:00 | 26.5 | 0 | 38 | 271 | 270 | 1 | 1.5 | 0.05 | −0.1 1 |
| — | — | — | — | — | — | — | — | — | — |

The calculations may be made for each desired time period, for example, hourly. The dashed lines indicate the intervening parameters and calculations for each such time period and, for convenience, those integers are not presented herein but are readily calculated from Eq. C.

In analyzing the data, we see that the summer values are perfect; the negative values mean that no direct sunlight is admitted. Winter values are good but could be better at 4:00 P.M. So, use Eq. B. This gives values of slope of 26.5° and tilt of 20°, which indicates that a better value can be achieved by tilting the shading elements down to a greater extent. Starting at a louver position between the two equations, slope and tilt angles of 26.5° and 10° are tried and radiation percentages of 76% at 1:00 P.M. and 87% at 4:00 P.M. are obtained. Because the 1:00 P.M. value went down, varying close positions on a matrix of slope versus tilt values are tried. Best overall angles of slope 30° and tilt 14° are found. However, a good fit at a slope of 28° and tilt of 10°, which gives better visibility and radiation percentages of 92% at 1:00 P.M. and 87% at 4:00 P.M. without sacrificing shade in the summer are found.

Also, the louver spacing, louver width and thickness are given in inches. The negative signs for % radiation indicate zero light transmission through the shading elements. Next, several different values of s and t may be calculated to find optimum values for the specific application. This is an iterative operation by which the designer can compare the heat gain performance at several slightly different angles. This operation allows the designer to make decisions as to which variables are most important in each particular application. If passive solar heating is a major goal, a good fit can be found by overlaying the spreadsheet values for percentage of light onto a graph of actual Btu's available at each hour to let more light in at the hours when the sunlight is the strongest. The original output in percentage of light can be converted to Btu's by multiplying the percentage for each hour by the Btu's available at that hour of day, from a known chart or formula. Then the hourly totals can be added to obtain a daily total for each season. This ratio of winter daily total Btu's to summer daily Btu's is a quantitative way to maximize the efficiency of the shading elements.

The example given above is for an exterior shade system. If the shading elements are disposed between two panes of glass, the depth of the elements is reduced to fit between the planes, and the spacing between elements is decreased accordingly.

The system enables choices on the basis of a strict seasonal ratio of winter to summer or the output can be weighted toward one season or another, depending on local climatic factors and specific needs of a building. As an example of the latter, a building used as an office building where occupants leave at five o'clock may sacrifice shading capacity in the late afternoon for a better heat gain in the winter, since any heat built up after five o'clock will not concern the occupants and will most likely dissipate before the following morning. This can be accomplished by slightly adjusting the slope and tilt angles or simply by increasing the spacing between the elements.

This hour-by-hour analysis enables many different variables and combinations of variables to be compared for each specific building application and each specific orientation of a building wall and window at a known latitude. This analysis, used together with the present shading elements, enables a very efficient shading, seasonably selective, passive solar heat limiting and solar heat system.

The above example is for a west-facing window. However, there are many different combinations of slope and tilt angles, depending on the latitude and compass orientation at the site. For example, a shading louver in a south-facing window may have a slope of zero but an upward tilt (as opposed to the traditional downward tilt of exterior louvers). The shading elements of a west-south-west orientation may have a tilt of zero but a slope upward to the south.

These elements can be finely tuned for maximum efficiency by customizing the design for an exact location and orientation. That is, a building not facing directly east and west could have custom louvers. However, the louvers can also be mass-produced for more general "east," "south-east," "south-west" and "west" orientations and a specific latitude or range of latitudes. The shading system hereof can also be used overhead, in horizontal or sloped applications, such as a shading system for sloping skylights, trellises, awnings or greenhouses. It can be located outside, attached to the window opening, set away from the window, inside or in-between window panes. The shading system hereof can be used as a window insert, between two panes of insulated glass, embedded within the glass, as an exterior panel to deflect heat, as an exterior shade, as an interior shade, as a clerestory panel, as an exterior trellis outside, as a window screen, as a skylight insert or shade, a monitor or sawtooth or other roof window insert, or in any other configuration where sun control is desired. The elements can be used to shade an open area as in a patio or courtyard. The shading system per se may be formed of wood, punched metal, woven metal, fabricated metal, paper, plastic, glass, fabric, bamboo, natural materials, composites, reflective film, any other appropriate material, or even of composite assemblies, for example, a sloped form of venetian blinds. Elements of the system can be made integrally of sheet material and manufactured by a punched plate method, made of separate elements and assembled, or woven. The geometry can be incorporated into the weave of cloth to create a shade screen in a single piece of fabric, or into the weave of a wire screen.

Further, the shading elements need not be entirely passive. For example, slope angles can be calculated as well as tilt angles if desired using the three equations set forth above. The shading elements, however, can be fabricated with adjustable tilt angles at the calculated slopes. While this requires user interaction, the system benefits from the calculated slope angle.

Figure 8A:
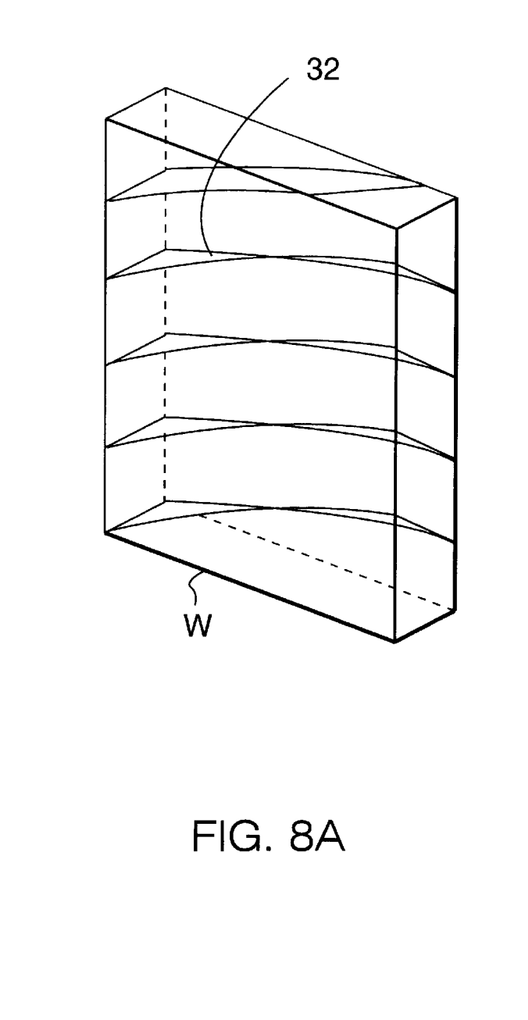
FIG. 8A, 8B and 8C are schematic illustrations of a window of a building having twisted louvers as viewed from the southwest, west and northwest, respectively.
Figure 8B:
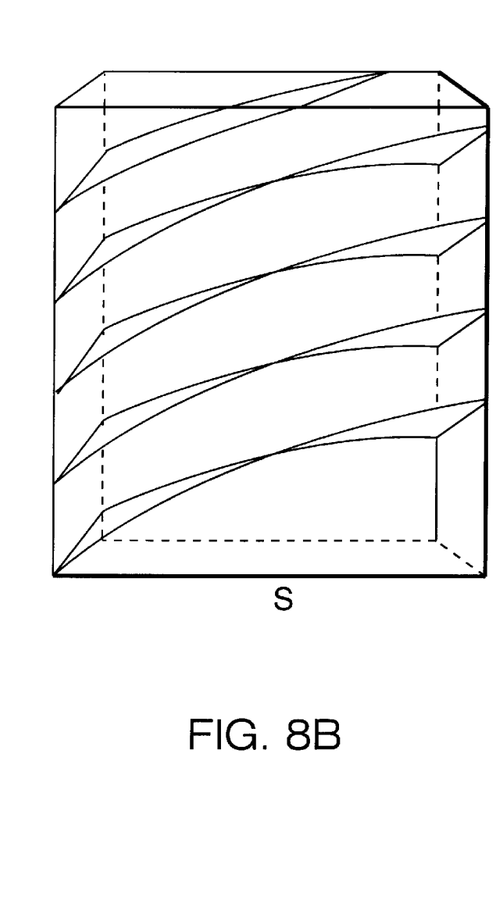
Figure 8C:
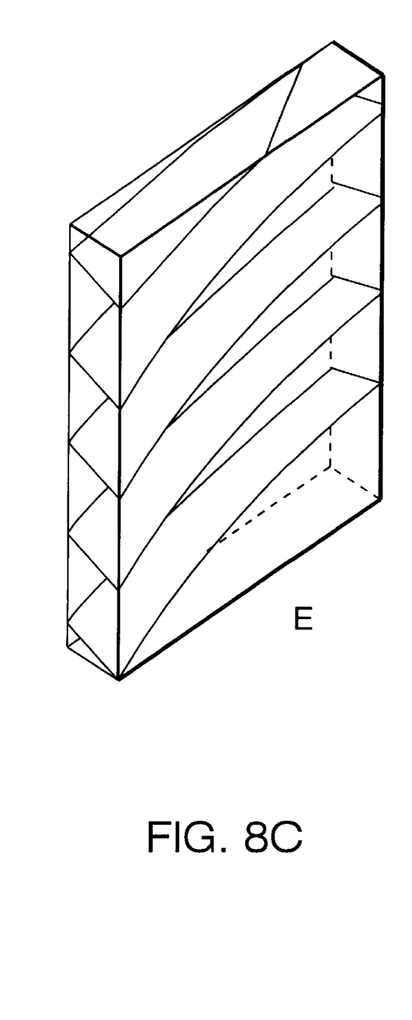

Referring now to FIGS. 8A, 8B and 8C, there is illustrated a window unit having a plurality of shading elements 30, for example, in the form of louvers 32. The elements 30 may be disposed in the window with the long axes of the shading elements horizontal or at a slope to the horizontal plane tangent to the spherical earth at the building site. In this form, however, the louver is twisted from one end to its opposite end about the long axis to optimize the shading effect in accordance with the sun's apparent path about the building site. For example, the window units of FIGS. 8A, 8B and 8C disclose a west-facing window unit as viewed in the drawing figures from the southwest, west and northwest, respectively. Consequently, the north end of the louvers would have a positive or downward tilt and a negative or upward tilt on the south end to favor the sun's rays from the southwest over the rays from the northwest. Winter light transmission can be optimized with this arrangement, while simultaneously optimizing the summer shading effect.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a building having a plurality of walls angularly related to one another and windows in said walls having at least in part a solar exposure, a shading system, comprising:

a plurality of elongated, generally linearly extending elements spaced from one another forming a group of shading elements for each of said windows and having non-opaque areas between said elements for transmitting light, said elements for each window having length, width and thickness dimensions with their length dimensions in excess of their width dimensions, said elements having a slope and tilt extending in the direction of the length and width dimensions of said elements, respectively, and extending generally parallel to one another at predetermined slope and tilt angles, the slope and tilt angles of said elements being such that said elements for each window lie generally parallel to a common plane with the slope of said elements in one of said windows defining an acute angle with a horizontal plane extending through the one window, said common and horizontal planes being angularly related to one another.

2. A system according to claim 1 wherein the slope and tilt angles of said elements of all said windows are such that the elements lie generally parallel to said common plane.

3. A system according to claim 1 wherein said elements comprise louvers spaced from one another and said common and horizontal planes are right angularly related to one another.

4. A system according to claim 1 wherein the tilt angle of said elements is adjustable.

5. A system according to claim 1 wherein the slope and tilt angles of said elements are fixed.

6. A system according to claim 1 wherein the slope and tilt angles of the elements are calculated from the following equations:

tan s=tan(90-23.5-lat)×sin b tan t=tan(90-23.5-lat)×sin(90-b)

wherein:

s=slope of said elements b=bearing in compass degrees of lines normal to said windows t=tilt of the elements lat=latitude of the building.

7. In a building having a plurality of walls angularly related to one another and windows in said walls having at least in part a solar exposure, a shading system, comprising:

a plurality of elongated, generally linearly extending elements spaced from one another forming a group of shading elements for each of said windows and having non-opague areas between said elements for transmitting light said elements for each window having length, width and thickness dimensions and extending generally parallel to one another at predetermined slope and tilt angles, the slope and tilt angles of said elements being such that said elements for each window lie generally parallel to a common plane with the slope of said elements in one of said windows defining an acute angle with a horizontal plane extending through the one window, said common and horizontal planes being angularly related to one another;

wherein, in an X, Y and Z Cartesian coordinate system having X, Y and Z axes with the X and Y axes in said horizontal plane at a site of the building and for each window of the building including the elements therein lying in a plane containing the X and Z axes, the slope angle of each element is the angle between the horizontal plane and a line in the X, Z plane intersecting the element parallel to the length dimension thereof and the tilt angle of each element is the angle between the X, Y plane and a line in the Y, Z plane intersecting the elements.

8. A system according to claim 7 wherein the tilt angle of said elements is adjustable.

9. A system according to claim 7 wherein the slope and tilt angles of said elements are fixed.

10. In a building having at least one wall and a window in said wall having at least in part a solar exposure, a shading system, comprising:

a plurality of elongated, generally linearly extending, elements spaced from one another forming a group of shading elements for said window and having non-opaque areas between said elements for transmitting light, said elements in said window having length, width and thickness dimensions with their length dimensions in excess of their width dimensions, said elements having a slope and tilt extending in the directions of the length and width dimensions of the elements, respectively, said elements extending generally parallel to one another at predetermined slope and tilt angles, not parallel to horizontal and vertical planes.

11. A system according to claim 10 wherein the tilt angle of said elements is adjustable.

12. A system according to claim 10 wherein the slope and tilt angles of said elements are fixed.

13. A system according to claim 12 wherein said elements have slope and tilt angles dependent upon the latitude of the building site and compass bearing of the window to limit solar heat gain in the summer and enable solar heat gain in the winter.

14. A building according to claim 10 having a plurality of walls angularly related to one another and windows in said walls having at least in part solar exposures, said elements being disposed in each of said windows forming a group of shading elements in each window having non-opaque areas between said elements for transmitting light, the elements in each said window having length, width and thickness dimensions and extending generally parallel to one another at predetermined slope and tilt angles, said elements in a window of said angularly related walls extending at slope and tilt angles different than the slope and tilt angles of elements in a window of a second of said angularly related walls.

15. A shading system comprising a plurality of elongated, generally linear elements spaced from one another forming a group of shading elements and having non-opaque areas between said elements for transmitting light, said elements having length, width and thickness dimensions with their length dimensions in excess of their width dimensions, said elements having a slope and tilt extending in the directions of their length and width dimensions, respectively, and extending generally parallel to one another at predetermined slope and tilt angles, the slope and tilt angles of said elements being such that elements for each group lie generally parallel to a common plane which slopes upward to the south.

16. In an apparatus for shading a space, said apparatus having a plurality of generally elongated, linearly extending shading elements and non-opaque areas between said elements for transmitting light, said elements extending at slope and tilt angles relative to horizontal and vertical orientations at a site of said space, said elements each having length, width and thickness dimensions with their length dimensions in excess of their width dimensions, said elements having a slope and tilt extending in the direction of the length and width dimensions of said elements, respectively, a method comprising the step of determining the slope and tilt angles of said elements in accordance with the latitude of the site and compass bearing of the space occupied by said elements as determined with the following equation:

tan s=tan(90-23.5-lat)×sinb tan t=tan(90-23.5-lat)×sin(90-b)

wherein:

s=slope of each elements b=bearing in compass degrees of lines normal to said windows t=tilt of the elements lat=latitude of the building the step of forming the elements of the apparatus at said determined slopes and tilt angles.

* * * * *